UNITED STATES PATENT OFFICE.

WILLIAM AUGUST OTTO WUTH, OF PITTSBURG, PENNSYLVANIA.

MANUFACTURE OF CEMENT.

SPECIFICATION forming part of Letters Patent No. 643,856, dated February 20, 1900.

Application filed July 20, 1898. Serial No. 686,472. (No specimens.)

*To all whom it may concern:*

Be it known that I, WILLIAM AUGUST OTTO WUTH, a resident of Pittsburg, in the county of Allegheny and State of Pennsylvania, have invented a new and useful Improvement in the Manufacture of Cement; and I do hereby declare the following to be a full, clear, and exact description thereof.

My invention relates to the manufacture of a cement similar to what is known as "Portland" cement. It has been found that the high grades of this cement contain from about twenty-two to twenty-eight (22 to 28) per cent. of silica and from sixty to sixty-five (60 to 65) per cent. of lime, containing also from five to ten (5 to 10) per cent. of alumina and a small percentage of peroxid of iron, magnesia, soda, and sulfuric acid. In the making of such cement it is found desirable that the cement should contain from one (1) to one and one-half (1½) per cent. of soda, while the sulfur is objectionable unless it can be oxidized, so as to form the sulfate of lime, which is unobjectionable.

While it has been recognized that blast-furnace slag or cinder contained many of the ingredients necessary to produce a high-class Portland cement and that this slag as produced in our modern large blast-furnaces, where the coke, ore, and limestone were practically the same, varied but slightly in its composition, and therefore was especially suitable for the manufacture of a Portland cement because it was uniform in composition and being a waste product was extremely cheap, and while attempts have been made to produce the cement from the same, these attempts have not been entirely successful in producing a high-grade cement. A good average analysis of such slag, showing how closely the ingredients approach the Portland cement, is about as follows: silica, thirty-five per cent.; alumina, fourteen per cent.; peroxid of iron, 2.40 per cent.; magnesia, two per cent.; lime, forty-five per cent.; soda, .34 per cent.; sulfur, 1.40 per cent. The principal difficulty in the use of such slag is found in the presence of a larger proportion of sulfur than desirable in a high-grade cement and that this sulfur is present as sulfid of calcium, which has so great affinity for water that it prevents the cement from drying even after burning, and therefore greatly affects its physical qualities, tensile strength, &c., and for years a disagreeable odor arises—that is, until every trace of the sulfid is converted either into a sulfate or carbonate. Where cement has been formed from this blast-furnace slag or cinder, the custom has been to grind the cinder to an impalpable powder and then to roast it thoroughly in order to oxidize the sulfur present, and thereby convert the sulfid of calcium into a sulfate of lime. This roasting process is, however, a very slow and tedious one, and if the temperature of the roasting-furnace is a little too high the cinder is liable to melt partially, which prevents the action of the oxygen upon the sulfur, so that there is only a partial oxidation instead of a complete oxidation of the sulfur, while at the best this roasting process is expensive. After such roasting process it is necessary to grind the slag and mix it with a suitable proportion of lime and bake it in the same way that the cement-stone is mixed with the lime and baked, so that while the cinder is inexpensive the cost of treatment is great and it is difficult to produce as high a grade of cement because of the difficulty of oxidizing all the sulfur present.

The object of the present invention is to produce a high grade of cement from this blast-furnace slag by a cheap and simple process; and it consists, generally stated, in hydrating the lime to be added to the slag with water containing a soluble salt which will oxidize the sulfur of the slag at a high temperature (and for which purpose nitrate of soda is preferred) and then mixing the hydrated lime with the powdered blast-furnace slag and burning the mixture, it being found that the nitrate of soda or other such soluble salt provides the necessary oxygen to unite with the sulfur of the sulfid of calcium and convert the same into sulfate of lime, which is perfectly harmless, while where nitrate of soda is employed the proportion of soda in the resultant cement is increased thereby, and in this way the grade of cement is improved.

In practicing the invention I prepare the slag for treatment by grinding the same to a powder in the same way that the cement-stone is ground. I then prepare the lime for mixture with the slag to increase the proportion of lime in the cement, it being found desirable to have present practically three times the proportion of lime to the proportion of silica and the proportion of lime to be added of course depending upon the analysis of the slag. The lime is employed in the form of burnt lime, and in order to hydrate the same I prepare a solution of nitrate of soda or other soluble salt evolving oxygen at a high temperature, the nitrate of soda being dissolved in the water employed for hydrating the lime. I find it well to employ from two and one-half (2½) pounds to four (4) pounds of nitrate of soda to every hundred (100) pounds of slag, and as from fifty (50) to fifty-five (55) pounds of burnt lime are required to be added to every hundred (100) pounds of slag and about one (1) pound of water is required to hydrate every three (3) pounds of lime from sixteen (16) to eighteen (18) pounds of water will generally be required, and the nitrate of soda is dissolved therein. The burnt lime is then hydrated with the nitrate-of-soda solution. The powdered slag and the hydrated lime, which is in a condition of dry powder, are then mixed together thoroughly in proper proportions, as above stated, in the same way as in the regular practice in manufacturing cement, and in this way the entire mass is impregnated throughout with the nitrate of soda. The compound is then burned in the same way as in making the regular cement from cement-stone and lime, being either burned in powdered form or molded in bricks, as may be considered best, and being subjected to a very high heat for a number of hours. Under this high heat the nitrate of soda will furnish the oxygen required to convert the sulfid of calcium into the sulfate of lime and so neutralize the sulfid and render it perfectly harmless. The soda present will of course become part of the cement, and this is a great advantage, because the slag is low in soda, and all good cement should have not less than one (1) per cent. of soda, and this the nitrate supplies. In this way I have been able to produce a cement of high grade, similar to Portland cement, one analysis of the cement so formed showing it to contain about twenty-three per cent. of silica, sixty-one per cent. of lime, nine per cent. of alumina, 1.50 per cent. of soda, small proportions of peroxid of iron, magnesia, and manganese, and only .90 per cent. of sulfur, which was present as sulfate of lime. The cement produced in this way will of course vary in proportion to the ingredients of the slag and the proportion of lime and nitrate of soda added. As, however, the slag from the modern furnaces varies but little, as above stated, a high grade of cement of even quality can be produced in this way, and it can be produced very cheaply, because the slag is practically a waste product, while the nitrate of soda is extremely cheap, costing only about two (2) cents per pound, and the treatment is no more expensive than that in making the regular cement from cement-stone.

In the manufacture of the cement from the slag it is of course evident that other soluble salts which will evolve oxygen at a high temperature may be employed instead of the nitrate of soda. For this purpose different nitrates or chlorates may of course be employed. For example, the nitrates of potash, lime, baryta, strontia, &c., and chlorates of the same alkalis or alkaline earths may be employed. As, however, they are all more, and some of them very much more, expensive than the nitrate of soda, I prefer to employ it for the purpose of oxidizing the sulfids, not only on account of its cheapness, but for the other important reason of its increasing the proportion of soda in the resultant cement.

What I claim as my invention, and desire to secure by Letters Patent, is—

1. The herein-described process of forming cement, consisting in hydrating burnt lime with water containing a soluble salt which will evolve oxygen at a high temperature, mixing the hydrated lime with powdered blast-furnace slag and burning the mixture.

2. The herein-described process of forming cement, consisting in hydrating burnt lime with water containing a nitrate salt, mixing the hydrated lime with powdered blast-furnace slag, and burning the mixture.

3. The herein-described process of forming cement, consisting in hydrating burnt lime with water containing nitrate of soda, mixing the hydrated lime with powdered blast-furnace slag, and burning the mixture.

In testimony whereof I, the said WILLIAM AUGUST OTTO WUTH, have hereunto set my hand.

WILLIAM AUGUST OTTO WUTH.

Witnesses:
JAMES I. KAY,
ROBT. D. TOTTEN.